(12) United States Patent
Huang

(10) Patent No.: US 9,029,781 B2
(45) Date of Patent: May 12, 2015

(54) OCCUPANCY SENSOR DEVICE DESIGN FOR FIXTURE INTEGRATION AND A LIGHT WITH THE SAME

(71) Applicant: IR-TEC International Ltd., Taoyuan County (TW)

(72) Inventor: Wen-I Huang, Taoyuan County (TW)

(73) Assignee: IR-TEC International Ltd., Taoyuan County (TW)

( * ) Notice: Subject to any disclaimer, the term of this patent is extended or adjusted under 35 U.S.C. 154(b) by 0 days.

(21) Appl. No.: 13/726,897

(22) Filed: Dec. 26, 2012

(65) Prior Publication Data

US 2014/0061480 A1    Mar. 6, 2014

(30) Foreign Application Priority Data

Aug. 31, 2012    (TW) .............................. 101216789 U

(51) Int. Cl.
  *G01J 5/02*    (2006.01)
  *G01J 1/42*    (2006.01)
  *G01J 5/10*    (2006.01)
(52) U.S. Cl.
  CPC ..... *G01J 1/42* (2013.01); *G01J 5/10* (2013.01)
(58) Field of Classification Search
  CPC .... G08B 13/19; G08B 13/191; G08B 13/193; F12V 23/0442; F12V 23/0471
  USPC ............... 250/342, DIG. 1; D10/106.6, 106.8
  See application file for complete search history.

(56) References Cited

U.S. PATENT DOCUMENTS

| | | | | |
|---|---|---|---|---|
| 6,091,200 A * | 7/2000 | Lenz | .............................. | 315/159 |
| 6,222,191 B1 * | 4/2001 | Myron et al. | ................. | 250/353 |
| 7,490,960 B1 * | 2/2009 | Fiorino et al. | ................. | 362/276 |
| 7,800,049 B2 * | 9/2010 | Bandringa et al. | ............ | 250/239 |
| 2007/0262259 A1 * | 11/2007 | Wu et al. | ........................ | 250/342 |
| 2010/0294915 A1 * | 11/2010 | Williams et al. | ............ | 250/206.1 |
| 2012/0026733 A1 * | 2/2012 | Graeber et al. | ................ | 362/231 |
| 2012/0098437 A1 * | 4/2012 | Smed | ............................. | 315/152 |
| 2012/0112633 A1 * | 5/2012 | Lee | ................................. | 315/32 |
| 2012/0169507 A1 * | 7/2012 | Dyer et al. | ............... | 340/693.11 |
| 2013/0207528 A1 * | 8/2013 | Carberry et al. | .............. | 312/237 |
| 2013/0341510 A1 * | 12/2013 | Aurongzeb et al. | ........ | 250/338.1 |
| 2014/0028018 A1 * | 1/2014 | Weidman et al. | ........... | 285/140.1 |

* cited by examiner

*Primary Examiner* — David Porta
*Assistant Examiner* — Mindy Vu
(74) *Attorney, Agent, or Firm* — Rosenberg, Klein & Lee

(57) ABSTRACT

An occupancy sensor device has a sensor and a fastener. The sensor has a body and a connector. The body has a detector and a lens. The lens covers the detector. The connector is formed on the body. The fastener is connected securely to the connector of the sensor. When the occupancy sensor device is installed on a light, the connector is mounted through a sensor hole of a light cover first, and the fastener is connected securely to the connector. Then the installation is completed and the sensor device is mounted securely on the light cover. Because the sensor has the connector directly formed on the body and the connector can be connected securely to the fastener, the sensor device is easily mounted on various kinds of lights regardless of the structure of the base.

5 Claims, 6 Drawing Sheets

OCCUPANCY SENSOR DEVICE DESIGN FOR FIXTURE INTEGRATION AND A LIGHT WITH THE SAME

BACKGROUND OF THE INVENTION

1. Field of the Invention

The present invention relates to an occupancy sensor device, especially to an occupancy sensor device that can be assembled with various types of light fixture.

2. Description of the Prior Arts

A conventional light is usually controlled its on and off status by operating the manual switch, but the switch is not always hygienic such that contacting the switch may contaminate the user's hand. For example, germs may gather on the switch and pass to the user's hand upon multiple users' contacts. Thus, lighting fixture with an occupancy sensor built-in is introduced for actuating the light without operating the switch.

With reference to FIG. 6, the conventional lighting fixture with an occupancy sensor has a base 91, a lighting element, a light cover 92 and a sensor 93. The lighting element, such as a light bulb or a light tube, is mounted on the base 91. The light cover 92 is mounted on the base 91, covers the lighting element and has a sensor hole 921. Since the sensor 93 cannot be fixed by itself, the most common way to fasten the sensor 93 is to mount the sensor 93 securely on the base 91. The sensor 93 protrudes through the sensor hole 921 of the light cover 92 for detection. When the sensor 93 detects any person approaching, the sensor 93 provides signals to the lighting element and then the lighting element is turned on. After the person leaves the range of detection of the sensor 93, the lighting element is turned off automatically to save energy. Therefore, the user can turn on or off the light without touching anything. Besides, turning the light off automatically also saves energy.

The sensor 93 is mounted securely on the base 91 by welding or screwing. The base 91 has some through holes or threaded holes. However, the sensors 93 and the bases 91 of different brands may have different installation standards. For example, the position of threaded holes or the distances between the threaded holes may be different in the bases 91 of different brands. Therefore, if the sensor 93 is broken, the user must buy a new sensor 93 with totally the same installation standard so that the new sensor 93 could be mounted on the base 91, which causes inconvenience. Furthermore, if the sensor 93 of the specific installation standard is out of production, the user has to buy a new base 91 to replace the original and unbroken base 91 as well, which further wastes money and is not eco-friendly.

To overcome the shortcomings, the present invention provides an occupancy sensor device design for fixture integration and a light with the same to mitigate or obviate the aforementioned problems.

SUMMARY OF THE INVENTION

The main objective of the present invention is to provide an occupancy sensor device that can be assembled with various types of light fixture.

The occupancy sensor device has a sensor and a fastener. The sensor has a body and a connector. The body has a detector and a lens. The lens covers the detector. The connector is formed on the body. The fastener is connected securely to the connector of the sensor.

When the occupancy sensor device is installed on a light, the connector is mounted through a sensor hole of a light cover first, and the fastener is connected securely to the connector. Then the installation is completed and the sensor device is mounted securely on the light cover. Because the sensor has the connector directly formed on the body and the connector can be connected securely to the fastener, the sensor device is easily mounted on various kinds of lights regardless of the structure of the base.

Besides, the sensor device is also applicable for use on an ordinary light originally without sensor function by simply drilling a sensor hole on the light cover of the ordinary light for automatically switching the ordinary light on and off.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
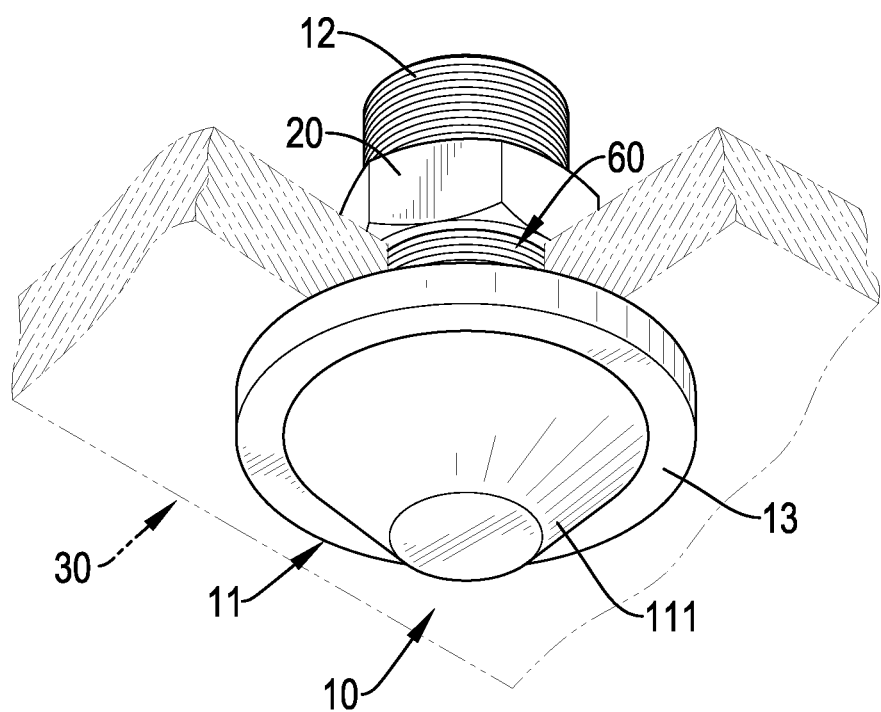
FIG. 1 is a perspective view of an occupancy sensor device in accordance with the present invention.

With reference to FIG. 1, an occupancy sensor device designed for fixture integration in accordance with the present invention comprises a sensor 10, a fastener 20, and a gap 60.

Figure 2:
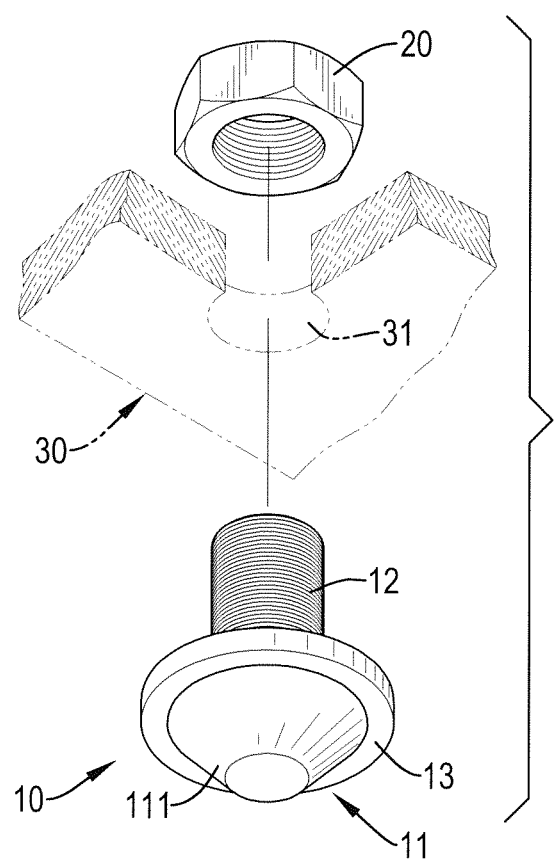
FIG. 2 is an exploded perspective view of the occupancy sensor device in FIG. 1.
Figure 3:
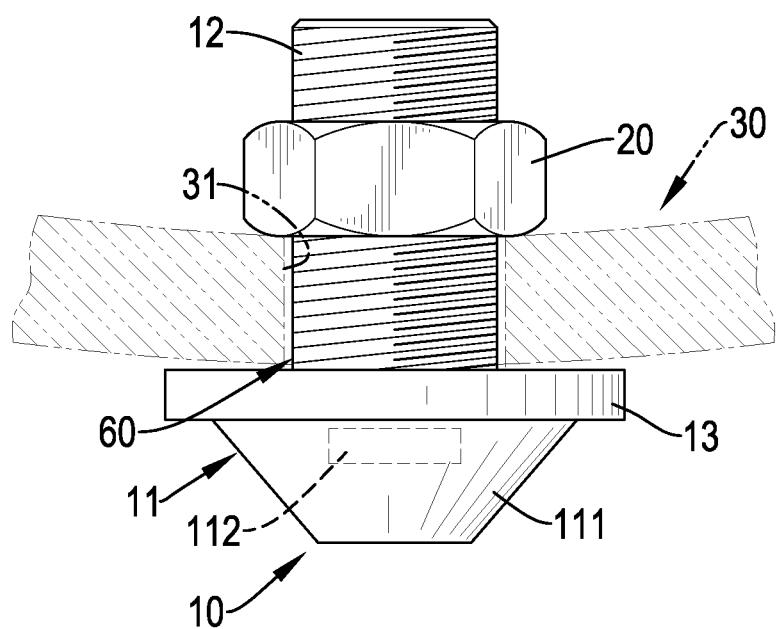
FIG. 3 is a side view in partial section of the occupancy sensor device in FIG. 1.

With reference to FIGS. 1 to 3, the sensor 10 has a body 11 and a connector 12. The body 11 has a detector 112 and a lens 111. The lens 111 covers the detector 112. The connector 12 is formed on and protrudes out of the body 11. The connector 12 and the detector 112 are in vertical alignment. In a preferred embodiment, the body 11 further has an annular flange 13 formed around an outside wall of the lens 111 of the body 11. The detector 112 is a passive infrared detector. The connector 12 has outer threads formed on an outside wall of the connector 12.

The fastener 20 is connected securely to the connector 12 of the sensor 10. In a preferred embodiment, the fastener 20 is a nut and is screwed onto the outer threads of the connector 12. The annular flange 13 of the body 11 and the fastener 20 are for contacting and directly clamping a light cover 30.

The gap 60 is formed between the body 11 of the sensor 10 and the fastener 20 for accommodating a light cover 30.

Figure 4:
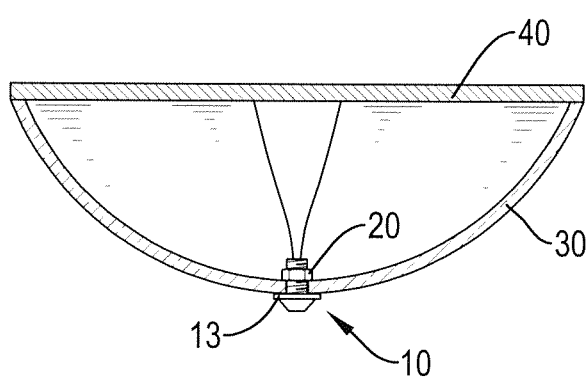
FIG. 4 is a side view in partial section of a light with an occupancy sensor device in accordance with the present invention.
Figure 5:
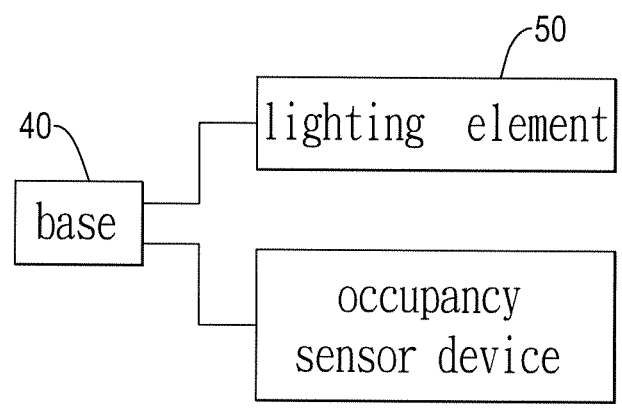
FIG. 5 is a function diagram of the light with an occupancy sensor device in FIG. 4.
Figure 6:
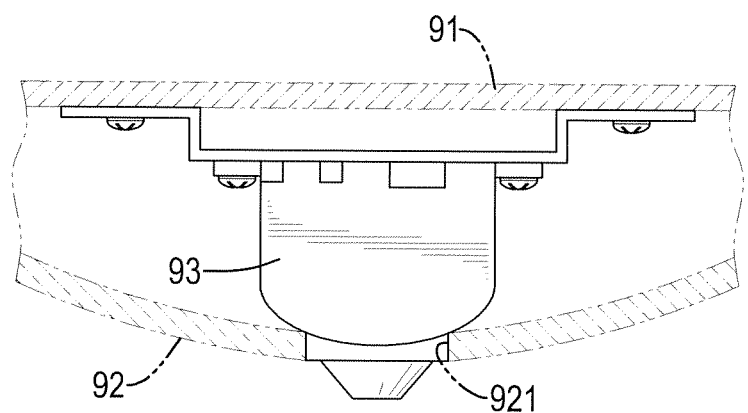
FIG. 6 is an enlarged side view in partial section of a light with an occupancy sensor device in accordance with the prior art.

With reference to FIGS. 3 to 5, a light with an occupancy sensor device in accordance with the present invention further comprises a base 40, a lighting element 50 and the light cover 30. The lighting element 50 is mounted on the base 40. The light cover 30 is mounted on the base 40, covers the lighting element 50, is mounted in the gap 60, and has a sensor hole 31.

The sensor device as described is mounted securely on the light cover 30 and electrically connects to the base 40. The connector 12 of the sensor 10 is mounted through the sensor hole 31 of the light cover 30. The fastener 20 is mounted between the base 40 and the light cover 30. The fastener 20 and the annular flange 13 of the body 11 of the sensor 10 contact and directly clamp the light cover 30.

Because the sensor 10 has the connector 12 directly formed on the body 11, the sensor device as described can be easily mounted on various kinds of lights regardless of the structure of the base. Besides, the sensor device as described is also applicable for use on an ordinary light originally without sensor function by simply drilling a sensor hole on the light cover of the ordinary light for automatically switching the ordinary light on and off.

In another preferred embodiment, the fastener also can connect securely to the connector of the sensor by other means. For example, the connector has multiple annular recesses. Each annular recess is formed around the outside wall of the connector, and the annular recesses are formed separately. The fastener is C-clip and engages one of the annular recesses so that the fastener and the sensor also can clamp the light cover.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An occupancy sensor device comprising:
    a sensor having
        a body having
            a detector;
            a lens covering the detector; and
            an annular flange transversely formed around an outside wall of the lens of the body; and
        a connector formed on and protruding out of the body;
    a fastener selectively connected securely to the connector of the sensor; and
    a gap formed between the body of the sensor and the fastener for accommodating a light cover;
    wherein the connector and the detector are in vertical alignment;
    wherein the annular flange of the body and the fastener are for contacting and directly clamping the light cover.

2. The occupancy sensor device as claimed in claim 1, wherein
    the connector of the sensor has outer threads formed on an outside wall of the connector; and
    the fastener is a nut and is screwed onto the outer threads of the connector.

3. The occupancy sensor device as claimed in claim 2, wherein the detector of the sensor is a passive infrared detector.

4. The occupancy sensor device as claimed in claim 1, wherein the detector of the sensor is a passive infrared detector.

5. A light with an occupancy sensor device as claimed in claim 1 comprising:
    a base;
    a lighting element mounted on the base; and
    the light cover mounted on the base, covering the lighting element, mounted in the gap, and having a sensor hole;
    wherein
    the occupancy sensor device is mounted securely on the light cover and electrically connects to the base;
    the connector of the sensor is mounted through the sensor hole of the light cover; and
    the fastener is mounted between the base and the light cover, and the fastener and the annular flange of the body of the sensor contact and directly clamp the light cover.

* * * * *